W. G. Ward,

Clothes Pin,

N° 62,240. Patented Feb. 19, 1867.

Witnesses;
Theo Trusch
J. A. Service

Inventor;
W. G. Ward
Per Munn &
Attorneys

United States Patent Office.

W. G. WARD, OF SAVONA, NEW YORK.

Letters Patent No. 62,240, dated February 19, 1867.

IMPROVED CLOTHES-PIN.

The Schedule referred to in these Letters Patent and making part of the same.

TO ALL WHOM IT MAY CONCERN:

Be it known that I, W. G. WARD, of Savona, in the county of Steuben, and State of New York, have invented a new and improved Clothes-Pin; and I do hereby declare that the following is a full, clear, and exact description thereof, which will enable others skilled in the art to make and use the same, reference being had to the accompanying drawings, forming part of this specification.

The present invention relates to a clothes-pin, and is an improvement on a clothes-pin invented and patented by me on the 17th day of August, A. D. 1866, the object being to produce a pin which will not work loose when on the clothes-line, and thus fall off, letting the clothes free in windy weather, the pin embraced in this invention being simple, cheap, and durable.

In the acompanying plate of drawings my improved clothes-pin is illustrated—

Figure 1:
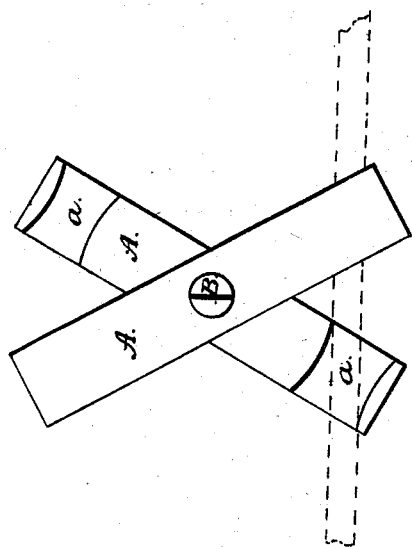

Figure 1 being a side view of the pin open, showing it ready for being placed upon the line.

Figure 2:
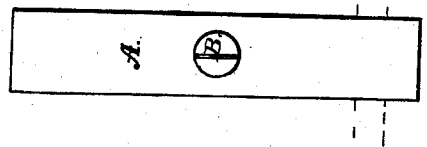

Figure 2, also a side view of the pin, but with it closed; and

Figure 3:
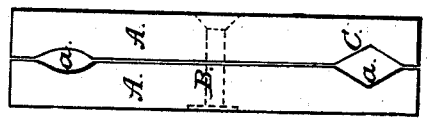

Figure 3, an edge view.

Similar letters of reference indicate like parts.

A A, in the drawings, represent the two arms of the pin, made of a similar shape and size, both in length and width, with notch $a$ at or near each end upon the same side of each of the bars or arms. These arms A are hung upon a common centre-pin, B, so as to swing or turn with their faces or sides, which are notched toward, and the notches directly opposite to, each other, forming openings $c$ of suitable shape to receive the clothes-line on which it is to be used. The pin, when to be used, being first opened, with its notches upon the line, as shown in fig. 1, and then closed together, which causes the pin to grasp the line, as is obvious without any further explanation and by an inspection of fig. 2 of the drawings

I claim as new, and desire to secure by Letters Patent—

The arms A, pivoted to each other at their centres, having notches $a$ at both ends on their inner faces, forming openings C when the arms are closed, adapting either end of the pin to be used, substantially as described.

W. G. WARD.

Witnesses:
H. W. LOOMIS,
M. T. WAGONER.